UNITED STATES PATENT OFFICE.

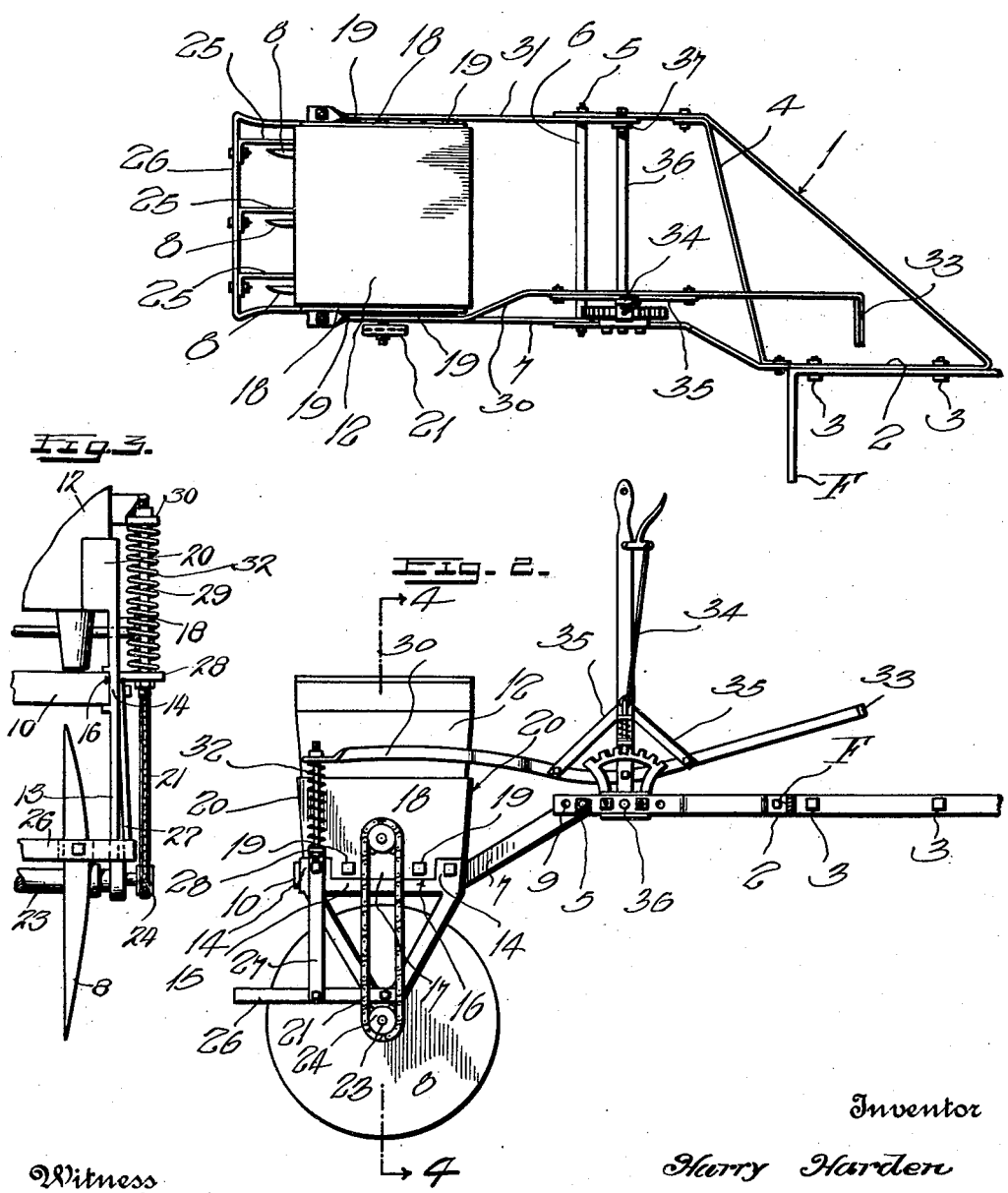

HARRY HARDEN, OF LONDON, OHIO, ASSIGNOR OF ONE-HALF TO ROBERT LINCOLN FARRAR, OF LONDON, OHIO.

IMPLEMENT-FRAME.

1,369,241.  Specification of Letters Patent.  Patented Feb. 22, 1921.

Application filed June 1, 1918. Serial No. 237,726.

*To all whom it may concern:*

Be it known that I, HARRY HARDEN, a citizen of the United States, residing at London, in the county of Madison and State of Ohio, have invented certain new and useful Improvements in Implement-Frames; and I do declare the following to be a full, clear, and exact description of the invention, such as will enable others skilled in the art to which it appertains to make and use the same.

My invention relates to improvements in agricultural machines, and more particularly to one intended for either pulverizing the earth turned by a gang or sulky plow, or for simultaneously pulverizing the earth and seeding the same.

One object of the invention is to provide a device of the class set forth which may be easily attached to practically all types of gang and sulky plows.

A further object of the invention is to provide a detachable seed hopper mounted in a novel manner so that it may readily be removed when its use is not needed.

A still further object is to provide an attachment of the class specified which may be easily and inexpensively manufactured and marketed, yet one which will be highly efficient and durable.

With the foregoing general objects in view, the invention resides in the novel features of construction and unique combinations of parts to be hereinafter fully described and claimed, the descriptive matter being supplemented by the accompanying drawings which form a part of this specification and in which:—

Figure 1 is a top plan view of the improved seeder and pulverizer.

Fig. 2 is a side elevation of the improved seeder and pulverizer.

Fig. 3 is a fragmentary view showing the seeder and pulverizer in end elevation.

In the drawings above briefly described, the numeral 1 designates a suitable horizontally disposed V-shaped frame having one of its side bars 2 formed with openings to receive bolts 3 or any other suitable fasteners, whereby the frame is rigidly secured in its front portion to one side bar of the frame F of a gang or sulky plow. The two side bars of the frame 1 are braced together as indicated at 4 and in rear of the brace, the inner side bar is offset outwardly, while the rear portion of the outer side bar is bent inwardly into parallel relation with the offset bar end. A transverse pivot bolt 5 extends between the rear ends of said bars and through a spacing sleeve 6, the front ends of a pair of draw bars 7 being positioned between the ends of said sleeve and the side bars of the frame 1, said draw bars being mounted on the bolt 5 so that they may be swung vertically to raise and lower the pulverizing disks 8 as occasion may demand. Furthermore, by moving either end of the bolt 5 forwardly or rearwardly into the openings 9 provided for this purpose, the angle of the disks 8 in respect to the line of draft, may be varied.

The rear ends of the draw bars 7 are rigidly secured to a transverse bar 10 which is preferably formed integrally therewith, whereas a second transverse bar 11 extends between and is secured to said draw bars a suitable distance in advance of said bar 10, these parts coöperating in forming a rectangular frame upon which the seed hopper 12 is designed to rest. A pair of V-shaped hangers 13 are provided at their upper ends with attaching ears 14 which are bolted or otherwise secured to the rear end portions of the draw bars 7, said hangers having horizontal bars 15 connecting their arms, at a level slightly below the upper ends of the ears 14, so that seats 16 are formed at the upper ends of the brackets, said seats being adapted to receive therein a pair of flanges 17 which depend rigidly from the lower edges of a pair of vertically disposed hopper retaining plates 18, bolts or the like 19 being provided for securing said plates to the bars 7. The plates 18 increase gradually in width toward their upper ends and are provided along their front and rear edges with inwardly extending flanges 20 which coact with said plates in forming tapered seats in which the hopper 12 is detachably seated. By this construction, it will be obvious that whenever the use of the hopper is unnecessary, it may be easily removed.

Any preferred number of disks 8 may be employed and they will in most cases be of the usual well known type. It is to be understood, however, that any suitable type of disks could well be employed. Regardless of their exact construction, the disks 8 will be rigidly secured upon a transverse shaft 23 which is rotatably mounted in bearings at the lower ends of the hangers 13, one end of said shaft being provided with a sprocket 24 which drives the chain 21 when the seeding hopper is being employed. Suitable cleaners 25 will in most cases be provided for the disks 8, said cleaners being mounted on a U-shaped frame 26 whose ends are secured to the hangers 13 at the lower ends of the latter.

Vertical bars 27 rise from the sides of the frame 26 and are secured at their upper ends to the adjacent portions of the hangers 13, said upper ends of the bars 27 being bent outwardly to form horizontal ears 28 from which bolts 29 rise through the rear end of a pair of crank arms 30 and 31, coiled springs 32 being interposed between said arms and ears as shown, so that they will exert their tension to depress the disks into the earth, the entire rear frame then rocking around the bolt 5. When, however, the arms 30 and 31 are raised, the bolts 29 will similarly raise the disks free of the earth. The arm 30 is formed by the rear end of a foot lever 33 which is rigidly secured between its ends to a vertical hand lever 34, braces 35 being provided for securing the two levers in fixed relation. Lever 34 rises rigidly from a transverse rock shaft 36 mounted on the rear end of the frame 1, said shaft having a vertical arm 37 to which the crank arm 31 is rigidly secured, so that when the shaft is rocked in one direction or the other, both arms 30 and 31 will coöperate in raising or lowering the disks as the case may be. It will be obvious that when the machine is to be raised clear of the earth, simultaneous actuation of the levers 33 and 34 will render this operation rather easy to perform. When lowering the disks to operative position, however, the foot lever need not be used.

From the foregoing, taken in connection with the accompanying drawings, it will be obvious that although the improved device is of extremely simple and inexpensive nature, it will be highly efficient and durable, particular emphasis being laid upon the fact that the seed hopper 12 is quickly and easily attachable and detachable, so that the machine may be quickly converted for use either as a combined seeder and pulverizer, or as a pulverizer only. In addition to this feature, however, I wish to direct attention to the numerous novel features of construction shown and described for carrying out the objects of the invention. These features, in actual practice, have proven highly satisfactory and for this reason they constitute the preferred form of the machine. It is to be understood, nevertheless, that within the scope of the invention as claimed, numerous minor changes may well be made.

I claim:

1. In a structure of the character described, a rectangular frame, V-shaped shaft-holding bearing brackets each having an upper cross bar connecting its side bars and having upstanding ears at its ends, the cross bar and ears having inwardly extending flanges engaging the side bars of said rectangular frame, plates resting upon said ears and having tongue extensions extending between the ears and connected with the side bars of the rectangular frame, and flanges carried by the plates and converging downwardly to provide a tapered hopper receiving seat.

2. In a structure of the character described, a rectangular frame, shaft-holding bearing brackets having upstanding ears and inwardly extending flanges for engaging the rectangular frame, and hopper engaging plates having their end portions resting upon the ears and having tongue extensions extending between the ears and connected with the rectangular frame, the plates having downwardly converging flanges forming a tapered hopper seat.

In testimony whereof I have hereunto set my hand in the presence of two subscribing witnesses.

HARRY HARDEN.

Witnesses:
SAM SNYDER,
H. C. PHINELL.